March 6, 1956 R. W. DOWLING 2,737,082
PICTURE-PROJECTION SYSTEM FOR PROJECTING MOVING PICTURES
Filed Feb. 2, 1955 2 Sheets-Sheet 1

INVENTOR.
Robert Whittle Dowling
BY
ATTORNEYS

March 6, 1956 R. W. DOWLING 2,737,082
PICTURE-PROJECTION SYSTEM FOR PROJECTING MOVING PICTURES
Filed Feb. 2, 1955 2 Sheets-Sheet 2

INVENTOR.
Robert Whittle Dowling
BY
*Pennie, Edmonds, Morton, Barrows & Taylor*
ATTORNEYS

United States Patent Office 2,737,082
Patented Mar. 6, 1956

2,737,082

PICTURE-PROJECTION SYSTEM FOR PROJECTING MOVING PICTURES

Robert W. Dowling, New York, N. Y.

Application February 2, 1955, Serial No. 485,751

Claims priority, application France February 24, 1954

6 Claims. (Cl. 88—24)

This invention relates to improvements in installations for the projection of motion pictures and more particularly to improvements in means for defining or outlining the useful area or dimensions of the screen on which the motion pictures are projected, and for varying the relative dimensions of that area and of the picture.

The present application is a continuation-in-part of my application Ser No. 407,719, filed February 2, 1954, for "Improvements in Installations for Motion-Picture Projection," corresponding to my French patent application No. 653,626, filed August 27, 1953. In these applications I have disclosed an installation in which the dimensions of the pictures projected on the screen are changed during the projection of the film by manipulating the focal length of the projection objective while, of course, maintaining the focus of the picture on the screen.

In the same applications I suggested that the useful dimensions of the screen be changed to frame the position of the picture on the screen by luminous edges obtained by sources of light carefully distributed on the back part of the screen and which were illuminated differently depending on the dimensions of the picture to be projected. In this connection it was suggested that the useful area of the screen be framed by a luminous projection of suitable color on the part of the screen which should not receive the picture.

The primary object of the invention is, therefore, to provide an installation in which the useful dimensions or picture area of the screen may at any moment be made respectively equal to the particular dimensions of the picture which is being projected onto the screen, by providing an illuminated border for the picture area.

A further object of the invention is to provide means for varying simultaneously and in agreement with each other the relative dimensions of the picture and of the picture area of the screen. In general the invention is comprised mainly in providing in installations of the kind in question, means capable of sending to the surface of the screen a beam of light rays, means for providing an opaque mask arranged in the path of the light rays, and a variable focus objection arranged between the mask and screen so that the screen presents a central dark or unlighted zone having dimensions proportional to those of the mask, but controllable by acting on the focal length of the objective, this dark or unlighted zone being provided to receive the motion pictures projected by the projector. The installation includes means for simultaneously varying the dimensions of the dark area and of the picture, and also the relative dimensions of the dark area and of the picture.

Aside from this general arrangement the invention comprises certain other arrangements and combinations which are used preferably at the same time but which, if desired, may be capable of being used separately and which will be explained more in detail hereinafter.

The invention is concerned, more particularly, with certain modes of application and realization of said arrangements, and it concerns furthermore, that is, as new industrial products, the installations of the kind in question which comprise application of these arrangements as well as the special elements, particularly the variable focus objectives suitable for their establishment.

The invention will be readily understood by means of the following additional description, as well as by the attached drawings, which description and drawings, it is to be understood are provided for purposes of illustration and example.

Figure 1:
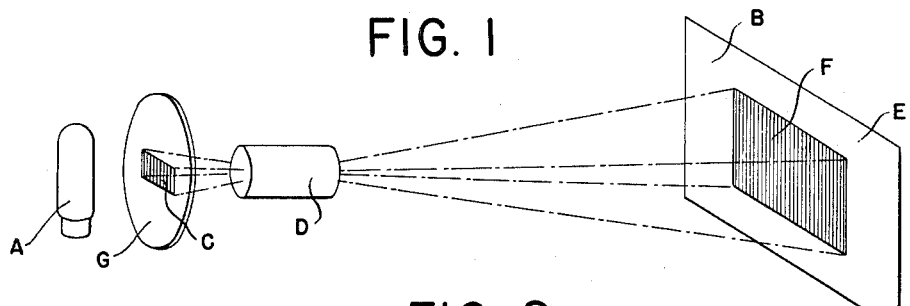
Fig. 1 shows schematically and diagrammatically a screen arrangement of variable dimensions together with means shown in general for changing the dimensions of the useful area of the screen according to the invention.

The present invention solves the difficulties involved in the framing of the useful area of the screen with light, or of providing a variable illuminated border for the picture area. Referring to Fig. 1 of the drawings, there are provided for this purpose, in projection installations of the kind in question, means such as a light projector A suitable for the purpose of sending to the surface of a screen B, a beam of light rays, means for providing an opaque mask C arranged in the path of the light rays from the projector A, and a variable focus objective D arranged between the mask C and the screen B through which the light rays pass. The light rays projected onto the screen B by the projector A, and which have not been intercepted by the mask C, form a light frame or illuminated border E inside of which is located a dark, unlighted or shadow zone F of dimensions proportional to those of the mask C. In order to vary the dimensions of the dark or unlighted zone F, which forms the useful part of the screen for receiving the picture, it is sufficient to change the focal length of the objective D while maintaining the image of the mask C in focus on the screen E.

The control of the objective D may be left to the initiative of the operator, but the control means of the objective D is preferably and advantageously combined with those which determine the changes in the dimensions of the picture. For instance, in the case where two projection objectives are used, one for pictures of normal size and one for pictures of enlarged size, the control means of the objective D may be so arranged that it can delimit on the screen B dark zones F which may have two sets of different sizes corresponding respectively to the pictures projected by the two projectors. In the case where a variable focus objective used to change the dimensions of the picture of the film, the controls of the variable focus objectives of the film and of the screen respectively are combined in such a way that the sizes of the picture and of the picture area or unlighted area of the screen agree at any instant during the projection.

If desired, the mask C may be so arranged as to be capable of changing the relation between its height and its width, which permits one to obtain on the screen a dark or unlighted zone having a ratio of height to width which is variable. In this way it is possible to realize at will a screen for standard or panoramic projections.

In the case where the variable screen arrangement is combined with an installation for projections of variable dimensions, the latter may be provided with a window having a height to width relation which is likewise variable, and the control means for this window may be combined with those for the mask of the variable screen arrangement so that the ratios, height to width, are the same for the projected picture and for the dark or unlighted zone of the screen. The variable screen arrangement may be equipped with means suitable for varying the coloration and intensity of the luminous border surrounding the useful area of the screen onto which the pictures are projected.

Figure 2:
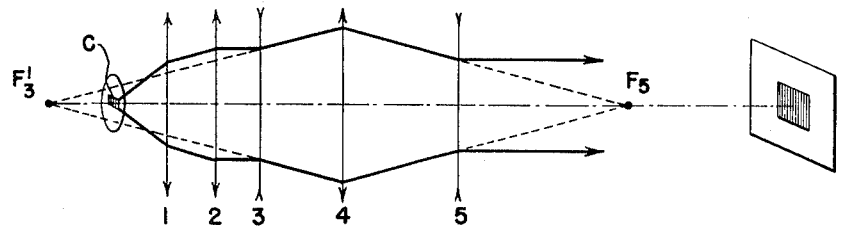
Fig. 2 is a schematic view representing an objective with variable focus of the arrangement shown in Fig. 1.

With respect to the variable focus objective D, shown in Figure 1, it preferably comprises a group of stationary lenses and a group of movable lenses, the latter group of lenses being movable with respect to the stationary lenses and with respect to themselves, the movements of these lenses being so connected mechanically as to change the dimensions of the picture area of the screen. One can imagine a large number of solutions for an objective of this kind, but the preferred and most advantageous form of construction which has been found is that disclosed and described in the above-mentioned patent applications and shown in Figs. 2, 3 and 4 of the present drawings. In Fig. 2 the objective is shown as comprising an ordinary objective having, for instance, two converging lenses 1 and 2 combined with an afocal system having a converging lens 4 located between two divergings lenses 3 and 5. The lenses 3, 4 and 5 of the afocal system are preferably achromatized separately as shown. The ordinary objective comprising lenses 1 and 2 gives of the mask C, a picture, or shadow, at infinity. The divergent lens 3 then gives a virtual picture at its focus $F^1_3$. The convergent lens 4 then gives a picture of the mask C at the conjugated point of $F^1_3$. With respect to the divergent lens 5, it is located in such a position that its focus $F_5$ coincides with the preceding picture, that is, it gives to the latter a picture or shadow at infinity.

Figure 3:
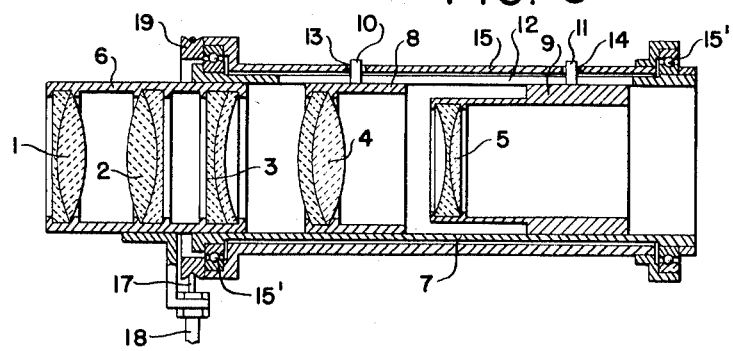
Fig. 3 is a longitudinal sectional view through an objective constructed according to the invention and the showing in Fig. 2.

The lenses 1, 2 and 3 are stationary and the lenses 4 and 5 are movable, the latter being connected among themselves mechanically in such a way as to vary the enlargement of the variable focus objective thus formed, while maintaining the picture or shadow on the screen in focus. Referring to Fig. 3 of the drawings, it will be noted that the mechanical connection is provided by attaching the lenses 1, 2 forming the ordinary objective, and the lens 3 in a mounting 6, in spaced relation, which in turn is attached to a cylindrical tube 7.

The lenses 4 and 5 are fixed in mountings 8 and 9, respectively, which may slide and rotate in the tube 7. The mountings 8 and 9 are so arranged that part of the mounting 9 carrying the lens 5 is capable of fitting into the mounting 8 and thus to permit the lenses 4 and 5 to be in contact with one another. The mountings 8 and 9 are equipped with lugs or studs 10 and 11, respectively, which extend through a longitudinal slot 12 in tube 7 and terminate respectively in helicoidal guide slots 13 and 14 provided in an outer tube 15 coaxial to the tube 7 and capable of rotation without being displaced longitudinally with respect to the latter. Ball thrust bearings 15' are placed between the two tubes 7 and 15 at the ends.

Figure 4:
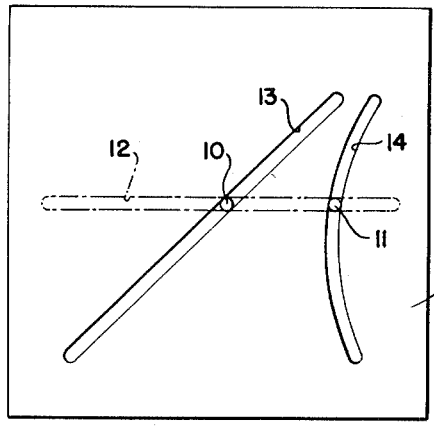
Fig. 4 represents a detail of a portion of the objective shown in Fig. 3 in unfolded plan view.

The tube 15 is turned or rotated around the tube 7, for example, by means of a metal cable or push-pull wire 17 extending through protective tubes 18 and around a drum 19 which is fixed to and forms a unit with the tube 15, the cable or wire 17 being attached at one point to the drum 19 for avoiding any slipping when the cable 17 is driven in one way or the other by suitable means controlled by a motor. It will be understood that by the means thus described, it is possible to impress on the lenses 4 and 5 displacements which correspond to the indicated conditions for a suitable tracing of the slots 13 and 14. The characteristics of the slots 13 and 14, as shown in Fig. 4 may be determined either by computation or by measurements on an optical bench in the manner described more in detail in the applications referred to above. The form to be given to the slots 13 and 14 is derived from these determinations. If the slot 13 is given a helical form, for example, such that, if the tube 15 is unwrapped on a plane or folded out flat, as shown in Fig. 4, the slot 13 would have a straight line path, and the slot 14 would have the form of a hyperbolic arc.

Now as regards the mask C, it is supported by a device such that the light rays issuing from the light projector A are practically not intercepted outside the zone which corresponds to the mask itself.

According to one advantageous mode of realization, the mask C is carried by a transparent glass plate G (Fig. 1) which is attached at its edges by any means outside the beam of light rays which reach the objective D. The mask itself may be formed by a sheet of paper or of opaque metal glued to the glass plate G.

In instances where it is desired to be able to obtain with the same device a screen area inside the border of either normal, or panoramic dimensions, the mask is advantageously divided into two parts $C_1$ and $C_2$ (Fig. 5), each carried by a transparent glass plate $G_1$ and $G_2$. These transparent glass plates may occupy one with respect to the other two different positions, one for which the half masks $C_1$ and $C_2$ are located edge to edge in which the combination of the two half masks then have a height to width ratio corresponding to the normal size, the other for which the half-masks $C_1$ and $C_2$ cover each other in part, which has the effect of reducing the height of the ensemble and, therefore, the height to width ratio to the value corresponding to the panoramic size.

Figure 5:
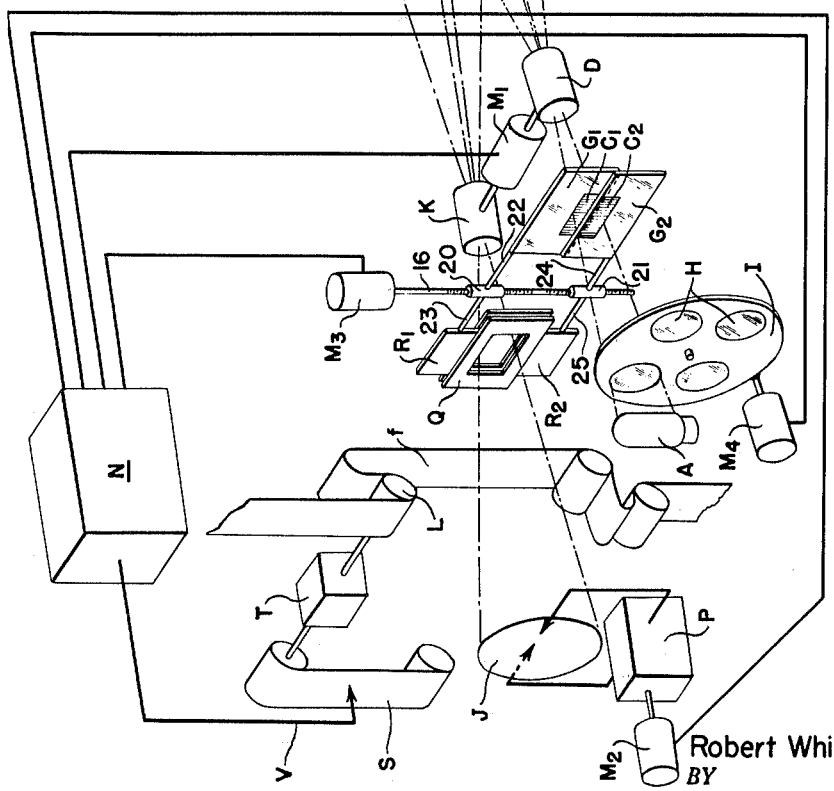
Fig. 5 represents schematically and diagrammatically a general view of a projection installation for motion pictures with a screen in which the dimensions may be varied in proportion or relative to each other, according to the invention.

The control mechanism for the two half glass plates $G_1$ and $G_2$ may be of any kind and be designed, as shown in Fig. 5, as including a rotatable rod 16 having two threads of the same pitch but of opposite directions. This mechanism, particularly this rod 16, may be operated either by hand or by any other means of which an example will be given hereafter.

The coloration of the luminous strips which delimit the dark zone, i. e. the luminous border surrounding and defining the useful area of the screen may be effected and modified by colored screens H located in the path of the light rays, for instance, between the light projector A and a light condenser (not shown) which is located ahead of the mask C or $C_1$ and $C_2$. These colored screens H may be carried by a rotatable disk I (Fig. 5) or by any other device which permits exchanging them one for the other during the operation of the installation.

The variable screen arrangement or border-forming means described above is incorporated advantageously in projection installations for motion picture projection of the type which forms the subject of the French and U. S. patent applications referred to above, which installations are suitable for changing simultaneously and coincidentally the dimensions of the projected picture and of the picture area of the screen.

Such an installation is shown in Fig. 5 and comprises essentially a source of light J, a variable focus objective K, a device L capable of passing the film $f$ between the source of light J and the objective K, and means suitable for changing the dimensions of the picture of the film on the screen and the dimensions of the picture area of the screen. This variation is obtained, according to the invention, by simultaneously varying the focal distances or lengths of the screen objective D and of the film or picture objective K.

According to an advantageous mode of realization, one subjects to the action of a control system N a servomotor $M_1$ which acts, at the same time, on the objectives D and K. When these objectives are both of the type shown in Fig. 3, which they preferably are, the motor $M_1$ is so arranged as to rotate simultaneously and in concordance the outer tubes, such as 15 of the two objectives, for example in the manner disclosed in said applications. The control system N likewise, by means of a servo-motor $M_2$, acts preferably on a means P capable of varying the flow of light, or light intensity for the motion-picture projector in such a direction that the illumination of each picture seems to be practically constant regardless of the dimensions given to the latter by the objectives D and K.

The control system N also includes means for causing a change of the installation from the normal size to the panoramic size or inversely. For this purpose, while the screen-mask is realized in or includes two parts each carried by a half glass plate $G_1$ and $G_2$, as explained before, the beam of the motion-picture projection unit is caused to pass through a window Q, the opening of which may be partially closed by means of two vertically movable masks or shutters $R_1$ and $R_2$, for changing the height to width ratio of the picture. The half glass plates $G_1$ and $G_2$ are mechanically connected, respectively, with the two masks $R_1$ and $R_2$ in such a way that the ratios height/width remain the same for the unit of the half masks $C_1$ and $C_2$ and for the free opening of the window Q.

Fig. 5 shows schematically masks $R_1$ and $R_2$ operated by the same rotating rod device 16 as the semi-glass plates $G_1$ and $G_2$. In this construction the rotatable rod 16 carries internally threaded sleeves 20 and 21, respectively, on its upper and lower threaded sections. The elements $G_1$ and $R_1$ are supported by rods 22 and 23 fixed to the sleeve 20, while elements $G_2$ and $R_2$ are supported by rods 24 and 25, respectively, fixed to the sleeve 21. When the rod 16 is rotated in one direction, the sleeves 20 and 21 are moved apart to provide a picture and useful screen area of normal size. When the rod 16 is rotated in the opposite direction, the sleeves 20 and 21 are moved toward each other to provide the panoramic size for the picture and useful screen area. Limiting switches may be used to determine accurately the extent of rotation in either direction. Thus, by means of a servomotor $M_3$ acting on the rod 16 and subject to the action of the control system N, it is possible to change at will from the normal size to the panoramic size and inversely.

Finally, if one has provided a device such as I capable of substituting the colored screens H for one another, it will be possible to operate said device I by a servo-motor $M_4$ likewise subject to the action of the control system N.

The simultaneous variations in the dimensions of the useful screen area and of the picture, as well as the various other operations of control N must be produced at definite moments of the projection according to a program established in advance for producing the best possible artistic effect. For this purpose, the care of operating the control system N according to said program may be left to the operator, but it is more advantageous to operate the system N automatically and in synchronism with the unwinding of the film f.

For this purpose, use may be made of the solution described in greater detail in the above-mentioned patent applications, according to which, one may, either by the film f itself, or, preferably, by an auxiliary or pilot strip S, driven in synchronism with the film f by its driving means L through a reduction gear T, carrying marks or signals which, when they are explored by a suitable system V, are capable of releasing or actuating the control system N in the direction desired for each of the operations. These marks or signals may be formed either by a photographic track having successive zones of different opacity, while the exploring system then has a beam of light which acts on a photo-electric cell, or, preferably, by different notches or slots, or even by their mutual arrangement in the longitudinal direction of the film, or of the pilot band, or even by their location in the transverse direction, with the exploring system then having one or more feeling fingers which establish electric contacts at the moment where the notches or slots pass in front of them. The thus-created current pulses act through the control system N on the control servo-motors by means of a system of relays, for example, in the manner disclosed in said applications.

The invention is not restricted to any specific electrical arrangement for carrying out the various operations described in connection with the diagrammatic showing in Fig. 5 of the drawings, since various electrical arrangements can readily be provided by those skilled in the art for effecting these operations in the disclosed synchronism, simultaneously or in sequence, in response to the marks, signals, or slots carried by the film f or the pilot band or strip S, and arranged according to a predetermined program for the particular film to be or being projected.

For example, the pilot strip S may carry slots for respectively actuating electric switches respectively to effect the following operations:

1. To increase simultaneously and correspondingly the dimensions of the picture projected on the screen and of the interior dimensions of the lighted border defining the useful screen area, as by the control motor $M_1$.

2. To decrease simultaneously and correspondingly the dimensions of the picture projected on the screen and of the interior dimensions of the border formed by the border-forming means, as by the control motor $M_1$.

3. To stop the increase and decrease respectively according to 1 and 2 to predetermined dimensions, as by stopping the motor $M_1$.

4. To simultaneously and in concordance change the projected picture and the picture border on the screen from the normal size to the panoramic size, or the reverse at predetermined times during a projection operation, as by the motor $M_3$.

5. To change or select the color of the picture border area of the screen during the projection of the pictures from the film f in accordance with the nature of the pictures being projected to achieve desirable artistic effects, for example, by means of the motor $M_4$, and 6. To vary the lighting intensity of the pictures projected, as for example by the motor $M_2$, for which means is provided for operating it in either direction a definite amount to increase or decrease the light intensity.

While the operating motors $M_1$, etc. are referred to as servo-motors, it is to be understood that equivalent motor means may be used and that Selsyn type motors and generator motor systems, may be used where applicable.

As a result of these operations, whichever mode of carrying out is adopted, one obtains a motion-picture projection installation whose operation and advantages will be clearly seen from the preceding explanations so that it will be unnecessary to go into additional detail for this purpose.

As it is self-understood, and as it, furthermore, already results from the above, the invention is by no means limited to that of its modes of application, nor to those of the modes of realization of its various parts which have been indicated more particularly; on the contrary, it embraces all variants.

What I claim is:

1. In a picture-projecting system for the projection of motion pictures including a projector for projecting pictures from a film onto the picture area of a screen, and a screen onto which the pictures are projected, means providing an illuminated border surrounding and defining the picture area of the screen, said dimensions corresponding to those of the pictures being projected onto the screen, means acting on said means for changing the effective inside dimensions of the illuminated border, means for changing the dimensions and area of the pictures projected onto the screen by the projector, and control means for synchronizing the operation of the means for changing the inside dimensions of the illuminated border and the means for changing the dimensions and area of the projected pictures on the screen to respectively increase and decrease the inside dimensions of the illuminated border and of the picture area of the screen with the increase and decrease respectively of the dimensions and area of the pictures projected onto the picture area of the screen by the projector.

2. A picture-projecting system as claimed in claim 1, in which the means for changing the inside dimensions of the illuminated border and the means for changing the dimensions of the pictures each comprise a variable optical objective.

3. A picture-projecting system as claimed in claim 1, including means responsive to the operation of the projector for operating the control means.

4. A picture-projecting system as claimed in claim 1, including means responsive to the operation of the control means for simultaneously changing the relative inside height-to-width dimensions of the illuminated border and of the relative height-to-width dimensions of the pictures projected onto the screen.

5. A picture-projecting system as claimed in claim 1, including means responsive to the operation of the projector for operating the control means, and means subject to the control means for changing the color of the illuminated border during the projection of the film.

6. A picture-projecting system as claimed in claim 1, in which the means for providing an illuminated border comprises a light projector, an optical objective through which the light from the light projector passes to the screen, and an opaque masking member interposed in the path of the light from the light projector to the screen having dimensions proportional to the inside dimensions of the illuminated border, said member excluding appreciable illumination of the picture area of the screen by the light projector while permitting the illumination of the border area of the screen surrounding the picture area.

References Cited in the file of this patent

UNITED STATES PATENTS

| | | |
|---|---|---|
| 595,541 | Hollen | Dec. 14, 1897 |
| 1,349,580 | Paradis | Aug. 17, 1920 |
| 1,361,274 | Miedreich | Dec. 7, 1920 |
| 1,758,938 | Feldner | May 20, 1930 |
| 1,790,232 | Flora | Jan. 27, 1931 |
| 1,806,452 | Fulgora | May 19, 1931 |
| 1,950,166 | Durholz | Mar. 6, 1934 |
| 1,951,707 | Preddy | Mar. 20, 1934 |
| 2,179,850 | Glancy | Nov. 14, 1939 |
| 2,488,955 | Wood | Nov. 22, 1949 |
| 2,501,219 | Hopkins et al. | Mar. 21, 1950 |